United States Patent
Kamphuis et al.

(10) Patent No.: US 9,785,199 B2
(45) Date of Patent: Oct. 10, 2017

(54) ONE WAY CLUTCH HINGE FOR A BASE OF A TABLET COMPUTER

(71) Applicant: Dell Products, LP, Round Rock, TX (US)

(72) Inventors: Kevin L. Kamphuis, Round Rock, TX (US); Jason S. Morrison, Cedar Park, TX (US)

(73) Assignee: DELL PRODUCTS, LP, Round Rock, TX (US)

(*) Notice: Subject to any disclaimer, the term of this patent is extended or adjusted under 35 U.S.C. 154(b) by 55 days.

(21) Appl. No.: 14/607,827

(22) Filed: Jan. 28, 2015

(65) Prior Publication Data

US 2016/0216743 A1    Jul. 28, 2016

(51) Int. Cl.
*G06F 1/16* (2006.01)

(52) U.S. Cl.
CPC ............ *G06F 1/1681* (2013.01); *G06F 1/166* (2013.01); *G06F 1/1632* (2013.01)

(58) Field of Classification Search
CPC .... G06F 1/1632; G06F 1/1601; G06F 1/1616; G06F 1/1643; G06F 1/1681; E05D 11/08; E05D 11/084
USPC ............ 361/679.12, 679.41–679.44, 679.26, 361/79.266; 16/221–392
See application file for complete search history.

(56) References Cited

U.S. PATENT DOCUMENTS

| | | | | |
|---|---|---|---|---|
| 5,323,290 | A | * | 6/1994 | Blair ................ F16M 11/10 16/445 |
| 5,325,984 | A | | 7/1994 | Ady et al. |
| 5,566,424 | A | * | 10/1996 | Crompton ............ G06F 1/1601 16/337 |
| 6,213,671 | B1 | | 4/2001 | Chang |
| 6,389,643 | B1 | | 5/2002 | Lim et al. |
| 8,941,985 | B2 | * | 1/2015 | Lee .................... G06F 1/1667 312/223.1 |
| 2006/0112519 | A1 | | 6/2006 | Harmon et al. |
| 2013/0170131 | A1 | * | 7/2013 | Yen .................... G06F 1/1632 361/679.44 |
| 2013/0175914 | A1 | * | 7/2013 | Lin ..................... G06F 1/1681 312/327 |
| 2013/0308263 | A1 | * | 11/2013 | Dondurur ............ G06F 1/166 361/679.12 |
| 2013/0322011 | A1 | * | 12/2013 | Yeh .................... G06F 1/181 361/679.44 |
| 2016/0153220 | A1 | * | 6/2016 | Hu .................... H04M 1/0212 361/679.27 |

\* cited by examiner

*Primary Examiner* — Anthony Haughton
(74) *Attorney, Agent, or Firm* — Larson Newman, LLP

(57) ABSTRACT

An information handling system includes a base, a hinge area, and a clutch device. The hinge area is in physical communication with the base, and includes a curved portion. The curved portion is to be placed in physical communication with a tablet computer when the tablet computer is in a first open position, and the hinge area is to hold the tablet computer in the first open position. The clutch device is located within the hinge area, and includes rollers, a shaft, and a clutch housing. A weight of the tablet computer is to exert a first torque on the clutch device. The rollers are to lock the clutch device in response to the first torque, and the clutch device locks in response to the rollers being placed in physical communication with both the shaft and the clutch housing.

18 Claims, 5 Drawing Sheets

US 9,785,199 B2

1

ONE WAY CLUTCH HINGE FOR A BASE OF A TABLET COMPUTER

FIELD OF THE DISCLOSURE

The present disclosure generally relates to a one way clutch hinge for a base of a tablet computer.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

Portable information handling systems, such as tablet computers, may be paired with a base having a keyboard and dock so that the keyboard can be an input device to the tablet computer. When the tablet computer is placed within the dock, the tablet computer can be held at a predefined angle for viewing by an individual.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

2

Figure 8:
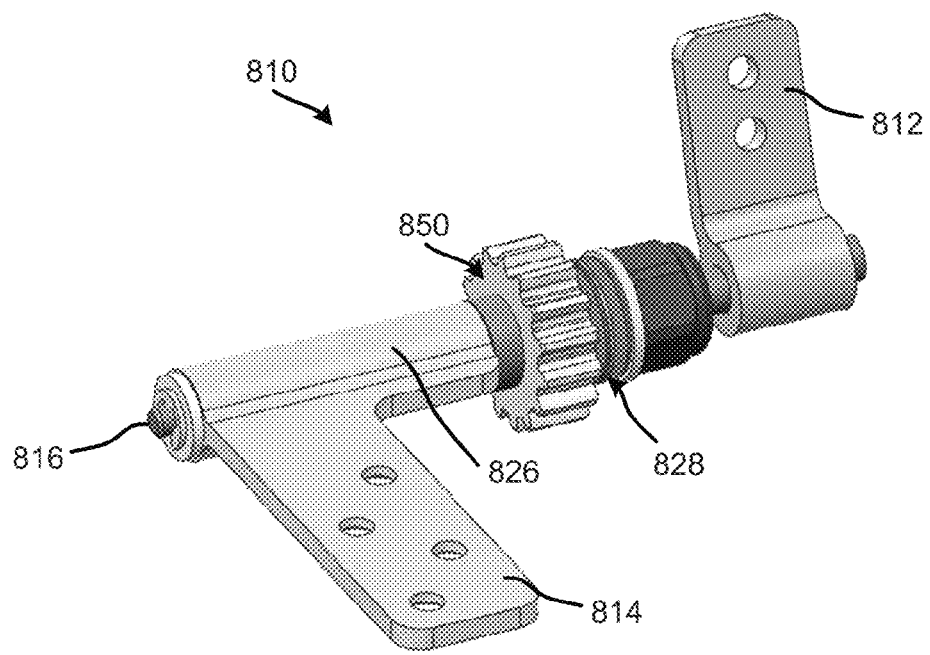

FIG. 8 is a diagram of another embodiment of the clutch device; and

Figure 9:
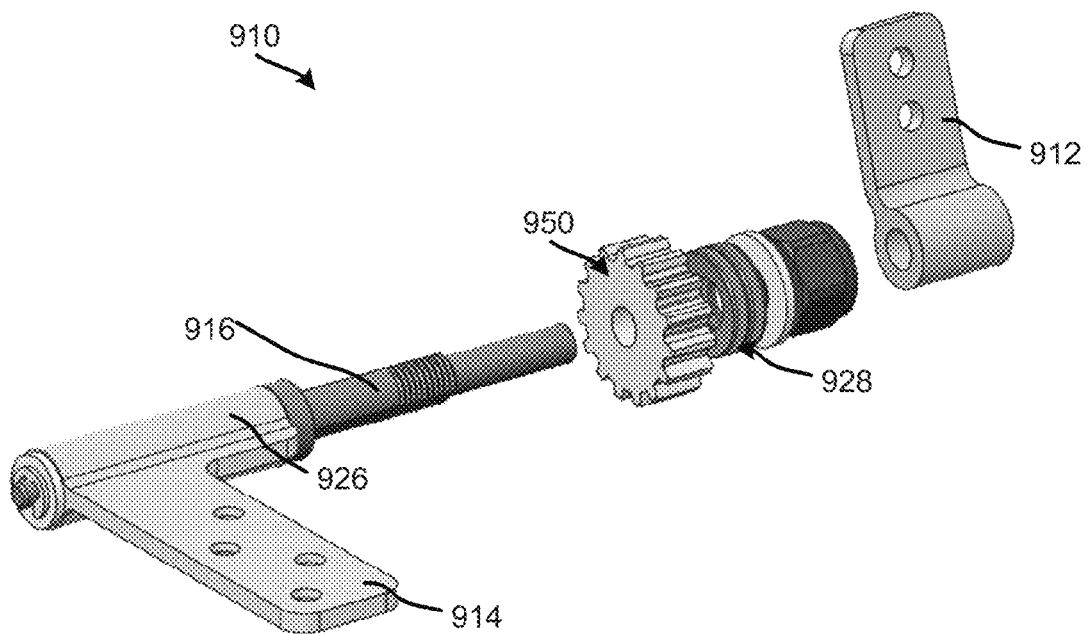

FIG. 9 is an exploded view of another embodiment of the clutch device.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing to teachings. This focus should not be interpreted as a limitation on the scope or applicability of the teachings.

Figure 1:
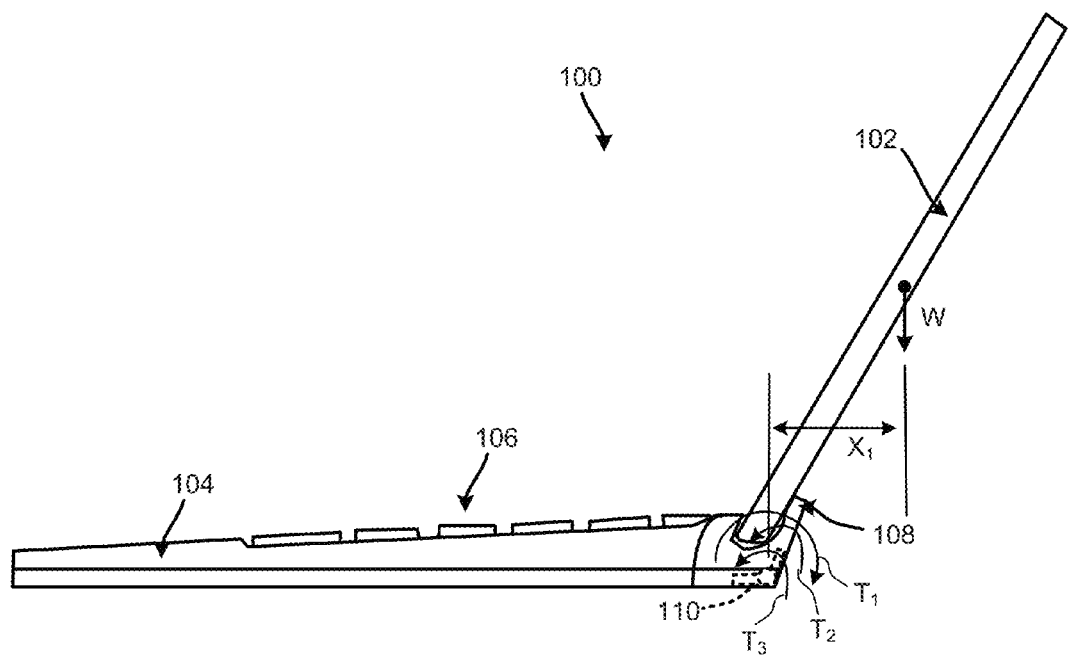
FIG. 1 is a diagram of an information handling system including a tablet computer and a base.

FIG. 1 shows an information handling system 100. For purposes of this disclosure, information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (RDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

The information handling system 100 includes a tablet computer 102 and a base 104. The base 104 includes a keyboard 106, a hinge area 108, and a clutch device 110 mounted partially within the hinge area and partially within the remaining portion of the base. In an embodiment, the information handling system 100 can include multiple clutch devices 110. However, for clarity and brevity only one clutch device 110 will be discussed with respect to the hinge area 108 and the remaining portion of the base 104. The tablet computer 102 includes a front surface, a back surface, and rounded edges connecting each of the four edges of the front surface to corresponding edges of the back surface. The hinge area 108 includes a curved portion to receive a rounded edge, the front surface, and the back surface of the tablet computer 102, and to hold the tablet computer in multiple open positions. In an embodiment, the clutch device 110 can be a one way clutch hinge, such that the clutch hinge resists rotation of a shaft of the clutch device with respect to outer portions of the clutch device in one direction, but allows the shaft to rotate within the clutch device substantially free of any resistive force in the other direction.

In an embodiment, the tablet computer 102 can be placed on top of the keyboard 106 of the base 104. In this placement, the tablet computer 102 can either be placed with a display screen of the tablet computer facing upward, so that the tablet computer can be utilized in as a tablet, or can be placed with the display screen facing downward, such that the information handling system 100 is in a closed position. The tablet computer 102 can also be placed in an initial open position, as shown in FIG. 1. In this position, the front surface, the back surface, and a rounded edge of the tablet computer 102 are placed within the curved portion of the hinge area 108. When the information handling system 100 is in an open position the keyboard 106 and the tablet computer 102 can communicate to enable an individual to utilize the keyboard as an input device to the tablet computer.

While the tablet computer 102 is placed in the initial open position within the hinge area 106, the weight, labeled W, of the tablet computer can exert a force downward on the hinge area relative to the center of gravity for the tablet computer, as shown in FIG. 1. In this situation, the clutch device 110, described in more detail with respect to FIG. 2 below, can include different components to resist a torque exerted on the hinge area 108 by the weight of the table computer 102 from causing the hinge area to pivot while the tablet computer is within the curved portion.

Figure 2:
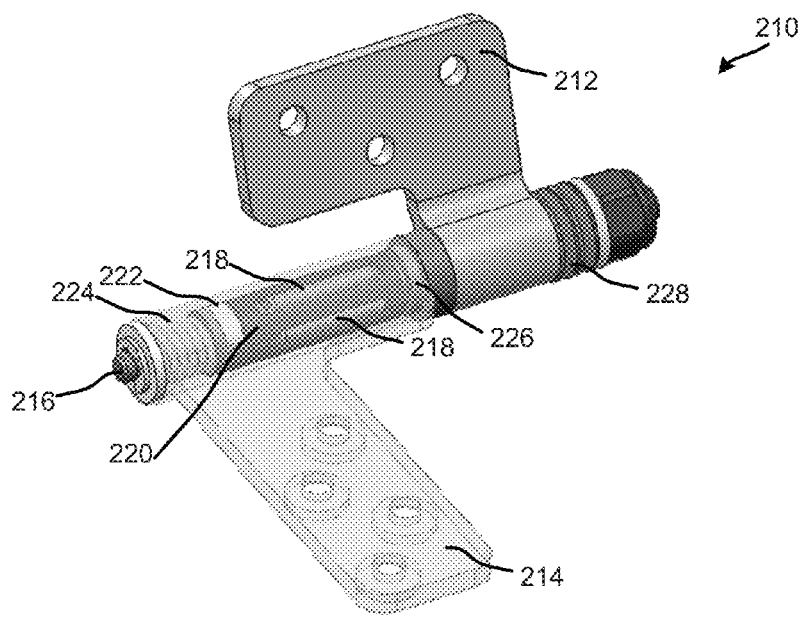
FIG. 2 is a diagram of a clutch device of the information handling system.

FIG. 2 shows a clutch device 210 including a first wing 212, a second wing 214, a shaft 216, rollers 218, a roller cage 220, a cam 222, a spring 224, a clutch housing 226, and friction elements 228. In the embodiment of FIG. 2, the shaft 216 extends the entire length of the clutch device 210, and the components of the clutch device are held under compression by securing components, such as washers at both ends of the shaft and a nut at one end of the shaft. In another embodiment, the components of the clutch device 210 can be held in compression by other types of securing components, such as a nut at each end of the shaft 216.

In an embodiment, the friction elements 228 can be concave washers, such that the friction elements exert a force on the shaft, which in turn provides a torque that resists the rotation of the shaft with respect to the wing 212 when the friction elements are under compression. The friction elements 228 exert the force of the shaft 216 by pushing the wing 212 into a portion of the shaft located between wings 212 and 214. Thus, a force greater than the force exerted by the friction elements 228 is required to cause the shaft to rotate with respect to wing 712.

In an embodiment, the shaft 216 includes multiple slots, and each slot includes a ramp that extends from one side of the slot to the other. Each of the rollers 218 can be located within a respective slot of the shaft 216, and the rollers can be held within the slots via the roller cage 220. The roller cage 220 preferably includes slots that correspond to the slots of the shaft 216 to maintain the rollers within the slots of the shaft. The spring 224 is mounted on the shaft 216 within the clutch housing 226. In another embodiment, the spring 224 can be located within the hinge area 108 without being in physical communication with the shaft 216. In both embodiments, the spring 224 can exert a force that in turn can exert a torque on the shaft to cause the clutch device to engage and lock in response to an additional torque being applied in an opposite direction of the torque applied by the spring. For example, the spring 224 exerts a force on the cam 222, which in turn exerts a torque to rotate the roller cage 220 until the rollers 218 are in physical communication with both the shaft 216 and the clutch housing 226.

When the rollers 218 are placed in physical communication with both the shaft 216 and the clutch housing 226, the rollers can lock the shaft such that the shaft cannot freely rotate with respect to the clutch housing 226 of wing 214 in the direction that the cam 222 forces the roller cage 220 to rotate and hold the rollers between the shaft and clutch housing. However, if a torque is exerted on the shaft 216 in a rotational direction opposite of the rotation of the cam 222, the rollers 218 fall within the slots of the shaft and are no longer in physical communication with the clutch housing 226. As a result, the shaft 216 can freely rotate with respect to the clutch housing 226 of wing 214.

Referring back to FIG. 1, the angle of the tablet computer 102 within the hinge area 108 causes the weight, W, of the tablet computer to exert a force downward on the hinge area and thereby exert a first rotational torque, labeled $T_1$, on the clutch device 110. The rotation torque exerted on the clutch device 110 is induced by a direction of rotation the hinge area 108 is rotatable with respect to the remaining portions of the base 104. The spring 224 can provide a second rotational torque, labeled $T_2$, on the cam 222 and thereby the shaft 216 of the clutch device 110, in the opposite direction of the torque exerted by the weight of the table computer 102. In this embodiment, the first rotational torque, $T_1$, exerted on the can be calculated by multiplying the weight, W, of the tablet computer 102 by a distance, labeled $X_1$, that a center of gravity of the tablet computer is from the clutch device 110 as provided in equation 1 below.

$$T_1 = W * X_1 \quad (EQ. 1)$$

In an embodiment, the clutch device 110 is engaged, such that the rollers 218 are in physical communication with both the shaft 216 and the clutch housing 226, in response to the torque, $T_1$, being greater than the torque, $T_2$, exerted by the spring 224, and the torque, $T_3$, exerted by the physical communication with both the shaft 216 and the clutch housing 226 as shown in equation 2 below.

$$T_1 = W * X_1 - T_2 - T_3 > 0 \quad (EQ. 2)$$

When the clutch device 110 is engaged, the physical communication of the rollers 218 with both the shaft 216 and the clutch housing 226 can cause a third torque, labeled $T_3$. In this embodiment, the weight of the tablet computer 102 can exert enough force to engage the clutch device 110, such that the hinge area 108 rotates in the direction of the force exerted by the tablet computer if the force exerted by the weight of the tablet computer cause the torque, $T_1$, to exceed the opposing torques, $T_2$ and $T_3$, exerted by the friction elements 228 of FIG. 2 and the spring 224. In this embodiment, the torques exerted by the friction elements 228 and the spring 224 are greater than the torque exerted by the weight of the tablet computer 102, such that the hinge area 108 does not rotate and the angle between the tablet computer and the base 104 remains the same. However, an individual can change the angle between the tablet computer 102 and the base 104 by applying an additional tierce in a direction away from the base as shown in FIG. 3.

Figure 3:
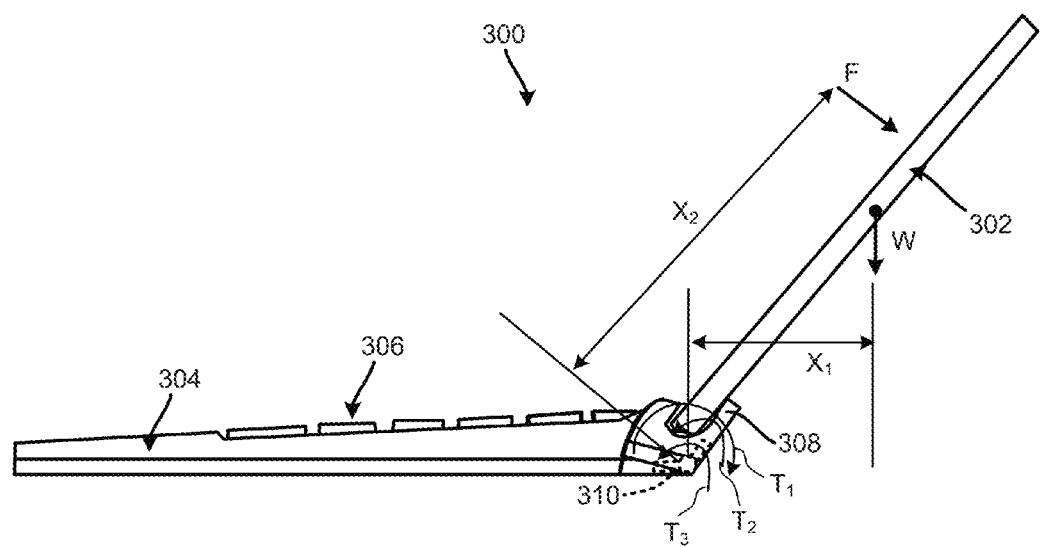
FIGS. 3 and 4 are diagrams of the tablet computer and the base in different stages of rotation of the tablet computer between an initial open position and a second open position.

FIG. 3 shows an information handling system 300 including a tablet computer 302 and a base 304. The base 304 includes a keyboard 306, a hinge area 308, and a clutch device 310 mounted partially within the hinge area and partially within the remaining portion of the base. As an individual pushes on the tablet computer 302, the hinge area 108 pivots and an angle between the keyboard 306 and the tablet computer 302 changes. For example, an individual can exert a force, F, on the top of the tablet computer 102 to push the tablet computer away from the keyboard 306, and as a result the angle between the tablet computer and the keyboard can increase. As the angle increases the viewable angle of a display screen on the tablet computer 302 changes for the individual. In response to the individual providing a force, F, on the tablet computer 302, the first rotational torque, $T_1$, exerted on the clutch device 310 can be calculated by multiplying the weight, W, of the tablet computer 302 by a distance, $X_1$, that the center of gravity of the tablet computer is from the clutch device 310 plus the force, F, multiplied by a distance, labeled $X_2$, that the application of the force on the tablet computer is from the clutch device as provided in equation 3 below.

$$T_1 = W*X_1 + F*X_2 \qquad \text{(EQ. 3)}$$

In this situation, the clutch device 310 is engaged, such that the rollers 218 are in physical communication with both the shaft 216 and the clutch housing 226, in response to the first rotational torque, created by the weight of the tablet computer 302 and the force applied by the individual being greater than the torque, $T_2$, exerted by the spring 224, and the torque, $T_3$, exerted by the physical communication of the rollers 218 with both the shaft 216 and the clutch housing 226 as shown in equation 4 below.

$$T_1 = W*X_1 + F*X_2 - T_2 - T_3 > 0 \qquad \text{(EQ. 4)}$$

The weight of the tablet computer 302 and the applied force can be enough to engage the clutch device 310, such that the hinge area 308 rotates if the torque exerted by the force on the tablet computer exceeds the opposing torque exerted by the friction elements 228 of FIG. 2. Thus, the individual can change the angle between the tablet computer 302 and the base 304 by applying a force, F, that is greater than the force applied by the frictional elements 228 to the shaft 216. When the individual has moved the tablet computer 302 to the desired angle, the individual can remove the force, F, so that the only force being applied to the hinge area 308 and the clutch device 310 is cause by the weight of the tablet computer. In this situation, the force applied by the weight of the tablet computer 302 can be less than the force exerted by the friction elements 228, such that the hinge area 308 does not rotate and the angle between the tablet computer and the base 304 remains the same.

Figure 4:
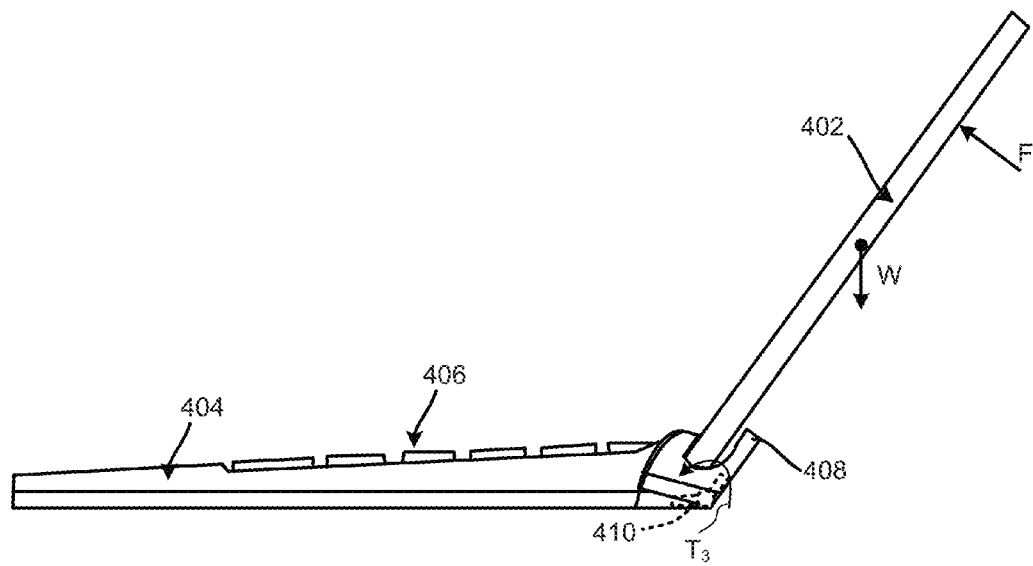

FIG. 4 shows an information handling system 400 including a tablet computer 402 and a base 404. The base 404 includes a keyboard 406, a hinge area 408, and a clutch device 410 mounted partially within the hinge area and partially within the remaining portion of the base. An individual can exert a force, F, on the top of the tablet computer 402 to push the tablet computer toward the keyboard 406, and as a result the angle between the tablet computer and the keyboard can decrease. In response to the individual providing the force, F, on the back surface of the tablet computer 402, the contact between the back surface of the tablet computer and the hinge area 408 is broken. In this situation, the weight of tablet computer 402 and the force applied by the individual do not act on the clutch device 410. Thus, the clutch device 410 is disengaged and the rollers 218 are no longer in physical communication with both the shaft 216 and the clutch housing 226. The first rotational torque, $T_1$, is substantially equal to a negative of the second rotational torque, $T_2$, applied by the spring 224, such that the first rotational torque $T_1$ is less than zero as provided in equation 5 below.

$$T_1 = -T_2 < 0 \qquad \text{(EQ. 5)}$$

Thus, as a result of the first rotational torque $T_1$ being less than zero, the shaft 216 can substantially freely rotate with respect to the clutch housing 226 of wing 214. Therefore, the rotation of the hinge area 408 toward from the base 404 aided by the force applied by the spring 224 to the shaft. Thus, the force restricting the rotation of the clutch device 410 toward the base 404 is less than the force restricting the rotation of the clutch device away from the base.

Figure 5:
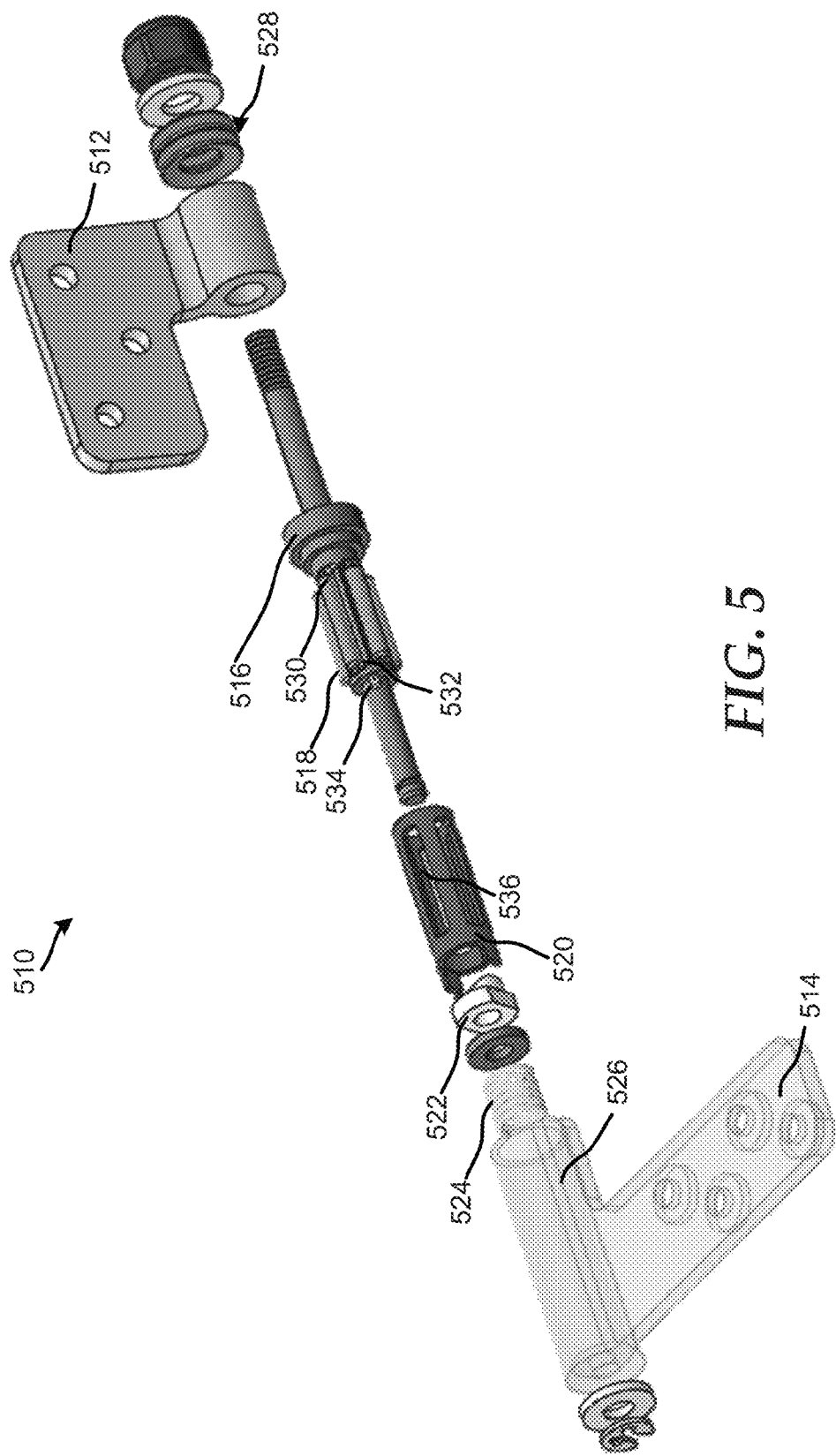
FIG. 5 is an exploded view of the clutch device.

FIG. 5 shows an exploded view of a clutch device 510 including a first wing 512, a second wing 514, a shaft 516, rollers 518, a roller cage 520, a cam 522, a spring 524, a clutch housing 526, friction elements 528, slots 530, ramps 532, and a cross pin 534. In the embodiment of FIG. 5, the shaft 516 extends the entire length of the clutch device 510, and the components of the clutch device are held under compression by securing components at both ends of the shaft.

In an embodiment, the friction elements 528 can be concave washers, such that the friction elements exert a force on the shaft to resist the rotation of the shaft with respect to the wing 512 when the friction elements are under compression. The friction elements 528 exert the force of the shaft 516 by pushing the wing 512 into a portion of the shaft located between wings 512 and 514.

In an embodiment, the shaft 216 includes multiple slots 530 that each includes a ramp 532 that extends from one side of the slot to the other. Each of the rollers 518 can be located within a respective slot 530 of the shaft 516, and the rollers can be held within the slots via the roller cage 520. The roller cage 520 preferably includes slots 536 that correspond to the slots 532 of the shaft 516 to hold the rollers within the slots of the shaft. When the clutch device 510 is put together, the spring 524 can exert a force on the cam 522, which in turn pushes the cam against the cross pin 534. As the cam 522 is pushed against the cross pin 534, the cam exerts a force to rotate the roller cage 520 until the rollers 518 are in physical communication with both the ramps 532 of the shaft 516 and the clutch housing 526. When the rollers 518 are placed in physical communication with both the ramps 532 of the shaft 516 and the clutch housing 526, the rollers can lock the shaft such that the shaft cannot rotate freely with respect to the clutch housing 526 of wing 514 in the direction that the cam 522 forces the roller cage 520 to rotate and hold the bearing between the shaft and clutch housing. However, if a force is exerted on the shaft 516 in a rotational direction opposite of the rotation of the cam 522, the rollers 518 fall within the slots 530 of the shaft and are no longer in physical communication with the clutch housing 526. As a result, the shaft 516 can freely rotate in this direction with respect to the clutch housing 526 of wing 514.

Figure 6:
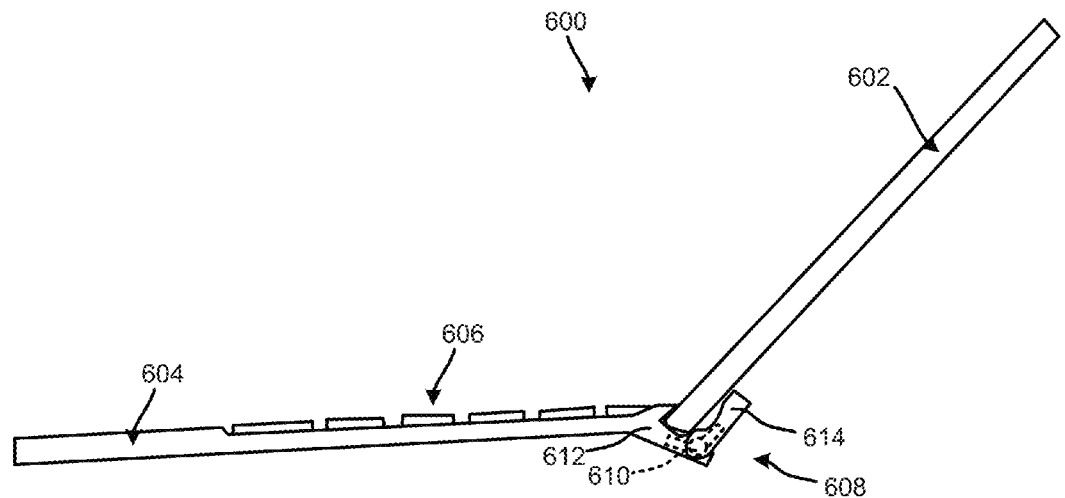
FIG. 6 is a diagram of an alternative embodiment of the information handling system.

FIG. 6 shows another embodiment of an information handling system 600 including a tablet computer 602 and a base 604. The base 604 includes a keyboard 606, a hinge area 608, and a clutch device 610 mounted partially within a front portion 612 of the hinge area and partially within a back portion 614 of the hinge area. In this embodiment, the clutch device 610 operates in substantially the same manner as the clutch device described above. In this embodiment, only the back portion 612 of the hinge area 608 rotates while the front portion 612 remains constant with respect to the remaining portions of the base.

Figure 7:
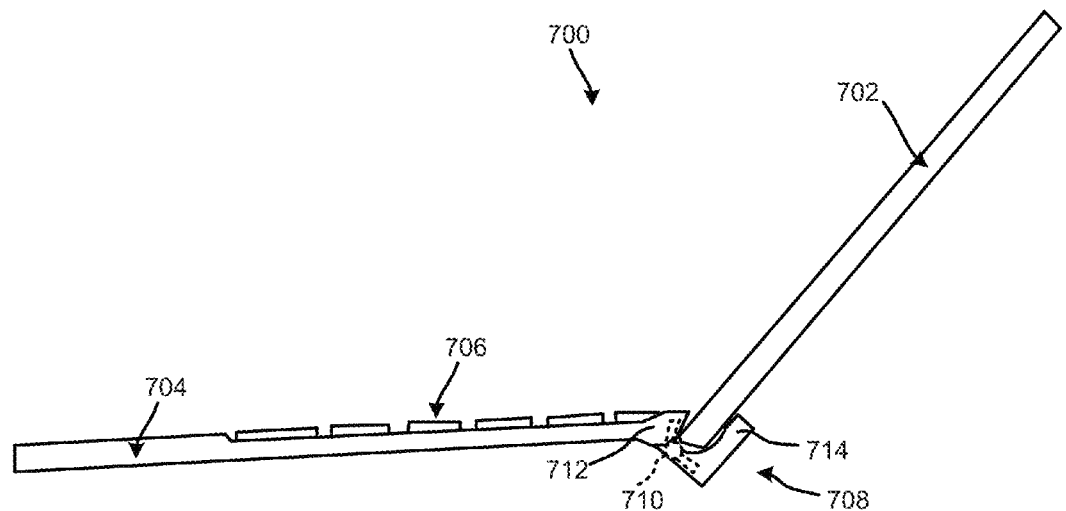
FIG. 7 is a diagram of an alternative embodiment of the information handling system.

FIG. 7 shows another embodiment of an information handling system 700 including a tablet computer 702 and a base 704. The base 704 includes a keyboard 706, a hinge area 708, and a clutch device 710 mounted partially within a front portion 712 of the hinge area and partially within a back portion 714 of the hinge area. In this embodiment, the clutch device 710 operates in substantially the same manner as the clutch device described above. In this embodiment, only the back portion 712 of the hinge area 708 rotates while the front portion 712 remains constant with respect to the remaining portions of the base.

FIG. 8 shows another embodiment of a clutch device 810. In this embodiment, the clutch device 810 includes a first wing 812, a second wing 814, a shaft 816, a clutch housing 826, friction elements 828, and a gear 850. In the embodiment of FIG. 8, the shaft 816 extends the entire length of the clutch device 810, and the components of the clutch device are held under compression by securing components, such as washers at both ends of the shaft and a nut at one end of the shaft. In another embodiment, the components of the clutch device 810 can be held in compression by other types of securing components, such as a nut at each end of the shaft 816. In an embodiment, the clutch device 810 includes rollers, a roller cage, a cam, and a spring within the clutch housing 826 as described above with respect to FIG. 2.

In an embodiment, the shaft 816 includes multiple slots, and each slot includes a ramp that extends from one side of the slot to the other. As described above, each of the rollers can be located within a respective slot of the shaft 816, and the rollers can be held within the slots via the roller cage. The spring is mounted on the shaft 816 within the clutch housing 826. The spring can exert a force that in turn can exert a torque on the shaft to cause the clutch device to engage and lock in response to an additional torque being applied in an opposite direction of the torque applied by the spring. For example, the spring exerts a force on the cam, which in turn exerts a torque to rotate the roller cage until the rollers are in physical communication with both the shaft 816 and the clutch housing 826.

When the rollers are placed in physical communication with both the shaft 816 and the clutch housing 826, the rollers can lock the shaft such that the shaft cannot freely rotate with respect to the clutch housing 826 of wing 814 in the direction that the cam forces the roller cage to rotate and hold the rollers between the shaft and clutch housing. However, if a torque is exerted on the shaft 816, via the gear 850, in a rotational direction opposite of the rotation of the cam, the rollers 818 fall within the slots of the shaft and are no longer in physical communication with the clutch housing 826. As a result, the shaft 816 can freely rotate with respect to the clutch housing 826 of wing 814.

In an embodiment, the friction elements 828 can be concave washers, such that the friction elements exert a force on the shaft, which in turn provides a torque that resists the rotation of the shaft with respect to the wing 814 when the friction elements are under compression. The friction elements 828 exert the force on the gear 850 and the shaft 816 by pushing the gear into a portion of the shaft located between wing 812 and the gear. Thus, a force greater than the force exerted by the friction elements 828 is required to cause the shaft to rotate with respect to wing 814. In an embodiment, the clutch device 810 can be incorporated with a component, such as a monitor, of an information handling system or other device, and the clutch device can be utilized to enable one way frictionless movement in a linear direction instead of a rotational direction of movement as described above.

In this embodiment, as the component is moved in a linear direction, such as vertical or horizontal, the gear 850 can apply a torque to the shaft 816. If the torque provided by the gear 850 is greater than the torque exerted by the spring and the physical communication of the roller with both the shaft and the clutch housing 826, the gear can cause the shaft to rotate and the component can move in a first direction. In this embodiment, the wing 812 is in physical communication with the shaft 816 to provide support for the clutch device, and the wing 812 can allow the shaft to freely rotated within wing 812, such that the wing 814 and gear 850 control the movement of the component within the information handling system.

FIG. 9 shows an exploded view of a clutch device 910 including a first wing 912, a second wing 914, a shaft 916, a clutch housing 926, friction elements 928, and a gear 950. The clutch device 910 also includes rollers, a roller cage, a cam, a spring, slots, ramps, and a cross pin within the clutch housing 926. In the embodiment of FIG. 9, the shaft 916 extends the entire length of the clutch device 910, and the components of the clutch device are held under compression by securing components at both ends of the shaft.

In an embodiment, the friction elements 928 can be concave washers, such that the friction elements exert a force on the shaft to resist the rotation of the shaft with respect to the wing 912 when the friction elements are under compression. The friction elements 928 exert the force of the shaft 916 by pushing the gear 950 into a portion of the shaft located between the gear and wing 914.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a hinge area including a curved portion, the curved portion to be placed in physical communication with a tablet computer when the tablet computer is in a first open position, and the hinge area to hold the tablet computer in the first open position; and
   a clutch device located within the hinge area, the clutch device including rollers, a shaft, and a clutch housing, a weight of the tablet computer to exert a first torque on the clutch device, the rollers to be placed in physical communication with both the shaft and the clutch housing in response to the first torque, and in response to the rollers being placed in physical communication with both the shaft and the clutch housing, the clutch device locks to prevent the shaft from rotating freely with respect to the clutch housing in a direction of the first torque.

2. The information handling system of claim 1, wherein the clutch device further includes a friction element, wherein in response to the hinge area and the clutch device being rotated from the first open position to a second open position, the rollers to lock within the clutch device and the friction elements to provide a second torque to resist rotation of the hinge area from the first open position to the second open position.

3. The information handling system of claim 2, wherein in response to the hinge area and the clutch device being rotated from the second open position to the first open position, the rollers to release within the clutch device to cause the rollers to no longer be in physical communication with the clutch housing, and the clutch device to provide a third torque to aid the rotation of the hinge area from the second open position to the first open position.

4. The information handling system of claim 3, wherein the second torque is in an opposite direction as the third torque.

5. The information handling system of claim 1, wherein clutch device further includes a roller cage, the roller cage to control movement of the rollers within the clutch device.

6. The information handling system of claim 1, wherein clutch device further includes a spring in physical communication with the shaft, the spring to force the rollers in physical communication with the shaft and with the clutch housing.

7. An information handling system comprising:
a base including a keyboard;
a hinge area in physical communication with the base, the hinge area including a curved portion, the curved portion to be placed in physical communication with a tablet computer when the tablet computer is in a first open position, and the hinge area to hold the tablet computer in the first open position; and
a clutch device located within the hinge area, the clutch device including rollers, a shaft, and a clutch housing, a weight of the tablet computer to exert a first torque on the clutch device in a direction away from the keyboard of the base, the rollers to lock the clutch device in response to the first torque, wherein the clutch device locks in response to the rollers being placed in physical communication with both the shaft and the clutch housing.

8. The information handling system of claim 7, wherein the clutch device further includes a friction element, wherein in response to the hinge area and the clutch device being rotated from the first open position to a second open position, the rollers to lock within the clutch device and the friction elements to provide a second torque to resist rotation of the hinge area from the first open position to the second open position.

9. The information handling system of claim 8, wherein in response to the hinge area and the clutch device being rotated from the second open position to the first open position, the rollers to release within the clutch device to cause the rollers to no longer be in physical communication with the clutch housing, and the clutch device to provide a third torque to aid the rotation of the hinge area from the second open position to the first open position.

10. The information handling system of claim 9, wherein the second torque is greater than the third torque.

11. The information handling system of claim 7, wherein clutch device further includes a roller cage, the roller cage to control movement of the rollers within the clutch device.

12. The information handling system of claim 7, wherein clutch device further includes a spring in physical communication with the shaft, the spring to torque rotation of the roller cage to place the rollers in physical communication with the shaft and with the clutch housing.

13. An information handling system comprising:
a component to move from a first position to a second position; and
a clutch device coupled to the component, the clutch device including rollers, a shaft, and a clutch housing, a weight of the component to exert a first torque on the clutch device, the rollers to lock the clutch device in response to the first torque, wherein the clutch device locks in response to the rollers being placed in physical communication with both the shaft and the clutch housing.

14. The information handling system of claim 13, wherein the clutch device further includes a friction element and a gear, wherein in response to the component being moved from the first position to the second position and the gear rotating in a first direction, the rollers to lock within the clutch device and the friction elements to provide a second torque to resist rotation of the gear in the first direction and the movement of the component from the first position to the second position.

15. The information handling system of claim 14, wherein in response to the component moving from the second position to the first position and the clutch device being rotated in a second direction, the rollers to release within the clutch device to cause the rollers to no longer be in physical communication with the clutch housing, and the clutch device to provide a third torque to aid the movement of the component from the second position to the first position.

16. The information handling system of claim 15, wherein the second torque is greater than the third torque.

17. The information handling system of claim 13, wherein clutch device further includes a roller cage, the roller cage to control movement of the rollers within the clutch device.

18. The information handling system of claim 13, wherein clutch device further includes a spring in physical communication with the shaft, the spring to place the rollers in physical communication with the shaft and with the clutch housing.

* * * * *